(12) United States Patent
Iyer et al.

(10) Patent No.: US 10,621,630 B2
(45) Date of Patent: Apr. 14, 2020

(54) METHOD AND SYSTEM FOR OBTAINING INTERACTIVE USER FEEDBACK IN REAL-TIME

(71) Applicant: WIPRO LIMITED, Bangalore (IN)

(72) Inventors: Manjunath Ramachandra Iyer, Bangalore (IN); Sethuraman Ulaganathan, Tiruchirapalli (IN)

(73) Assignee: Wipro Limited, Bangalore (IN)

( * ) Notice: Subject to any disclaimer, the term of this patent is extended or adjusted under 35 U.S.C. 154(b) by 400 days.

(21) Appl. No.: 15/475,247

(22) Filed: Mar. 31, 2017

(65) Prior Publication Data

US 2018/0232785 A1 Aug. 16, 2018

(30) Foreign Application Priority Data

Feb. 16, 2017 (IN) .............................. 201741005562

(51) Int. Cl.
*G06F 17/30* (2006.01)
*G06Q 30/02* (2012.01)

(52) U.S. Cl.
CPC ................................ *G06Q 30/0282* (2013.01)

(58) Field of Classification Search
USPC ......................................................... 707/733
See application file for complete search history.

(56) References Cited

U.S. PATENT DOCUMENTS

| | | | |
|---|---|---|---|
| 6,510,427 B1 | 1/2003 | Bossemeyer, Jr. et al. | |
| 6,601,759 B2 | 8/2003 | Fife et al. | |
| 7,567,983 B2 | 7/2009 | Pickelsimer | |
| 7,860,803 B1 | 12/2010 | Chang et al. | |
| 8,635,237 B2 | 1/2014 | Bansal et al. | |
| 9,092,789 B2 | 7/2015 | Anshul | |
| 9,111,218 B1 | 8/2015 | Lewis et al. | |
| 9,292,598 B2 | 3/2016 | Fraczak et al. | |
| 9,386,144 B2 | 7/2016 | Gartner et al. | |
| 9,443,252 B2 | 9/2016 | Chang et al. | |
| 2001/0037206 A1 | 11/2001 | Falk et al. | |
| 2004/0172323 A1 | 9/2004 | Stamm | |
| 2004/0230438 A1 | 11/2004 | Pasquale et al. | |
| 2007/0055694 A1 | 3/2007 | Ruge et al. | |
| 2007/0214000 A1 | 9/2007 | Shahrabi et al. | |

(Continued)

*Primary Examiner* — Hung T Vy
(74) *Attorney, Agent, or Firm* — Finnegan, Henderson, Farabow, Garrett & Dunner, LLP

(57) ABSTRACT

The present disclosure relates to a method and system for obtaining interactive user feedback in real-time by feedback obtaining system. The feedback obtaining system establishes connection between user device of user and server of service provider based on user location received from user device, receives static data of user from server and dynamic data of user from capturing device located at site of service provider, identify contextual information associated with user based on static data and dynamic data, provide one or more feedback queries for user from database based on contextual information, provide one or more sub-feedback queries for user based on response of user for one or more feedback queries and obtains user feedback based on response of user for one or more sub-feedback queries and one or more feedback queries and implicit feedback. The use of implicit feedback together with actual feedback gives effective feedback of users.

18 Claims, 5 Drawing Sheets

(56) References Cited

U.S. PATENT DOCUMENTS

2007/0232868 A1    10/2007  Reiner
2009/0112683 A1*   4/2009   Hamilton, II .......... G06Q 30/02
                                                      705/7.32
2011/0295722 A1*   12/2011  Reisman ............ G06Q 30/0201
                                                      705/27.1

* cited by examiner

METHOD AND SYSTEM FOR OBTAINING INTERACTIVE USER FEEDBACK IN REAL-TIME

TECHNICAL FIELD

The present subject matter is related in general to collecting feedback, more particularly, but not exclusively, to a method and system for obtaining interactive user feedback in real-time.

BACKGROUND

Over years, there has been a tremendous increase in business opportunities across the world for providing services to customers. Feedback from such users plays a decisive role in any business environment such as hotels, hospitals, restaurants, mall and the like. In today's customer centric environment, businesses rely on customers' feedback for improving services provided by them and for increasing their customer base. Several ways exist where businesses attempt to increase customer service quality such as, customer satisfaction surveys, increased customer communication and the like. However, such attempts for collecting customer feedback are not reliable in knowing actual expectations of the customers.

Today, there are many ways of collecting and determining customer feedback. One such way, in existing system is by a fixed template feedback taken with paper, electronic devices such as mobile phones, tablet and the like and oral means. The fixed template feedback method does not provide adequate insight to consumer's thoughts and pattern of the consumed services. Also, the existing systems largely ignore implicit feedback coming from actions, gestures and the like of the customers. Major business enterprises today are facing difficulty in having an integrated approach for collecting customers feedback, which may largely affect their sales and brand value. Generally, feedback is collected from the customers at a later stage when they have finished using the services.

There is no such mechanism in the existing system to take feedback during the period when the customer's is using the services. After utilizing the services, customer may tend to rush and hardly few of them are interested in providing the feedback. In addition, another problem arises when the customer experience and the feedback provided by them cannot be correlated. Since feedback is collected later, the actual customer experience might not be highlighted in the feedback especially where the customers fill the feedback in a rush. Even if the customer feedback is available, there is no means for the business enterprises to act upon the feedback at that time and provide resolution, if any to the customers, if their experience was not good.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method of obtaining interactive user feedback in real-time, the method comprising establishing a connection between a user device of a user and a server of a service provider based on a user location of the user received from the user device, receiving static data of the user from the server and dynamic data of the user from a capturing device located at a site of the service provider, identifying contextual information associated with the user based on the static data and the dynamic data. The contextual information comprises implicit feedback of the user. The method comprises providing one or more feedback queries for the user from a database based on the contextual information, providing one or more sub-feedback queries for the user based on a response of the user for the one or more feedback queries and obtaining user feedback based on a response of the user for the one or more feedback queries and the one or more sub-feedback queries and the implicit feedback.

In an embodiment, the present disclosure relates to a feedback obtaining system for obtaining interactive user feedback in real-time. The feedback obtaining system comprises a processor and a memory communicatively coupled to the processor, wherein the memory stores processor executable instructions, which, on execution, may cause the feedback obtaining system to establish a connection between a user device of a user and a server of a service provider based on a user location of the user received from the user device, receive static data from the server and dynamic data from a capturing device located at a site of the service provider, identify contextual information associated with the user based on the static data and the dynamic data. The contextual information comprises implicit feedback of the user. The feedback obtaining system provides one or more feedback queries for the user from a database based on the contextual information, provides one or more sub-feedback queries for the user based on a response of the user for the one or more feedback queries and obtains user feedback based on a response of the user for the one or more feedback queries and the one or more sub-feedback queries and the implicit feedback.

In an embodiment, the present disclosure relates to a non-transitory computer readable medium including instructions stored thereon that when processed by at least one processor may cause a feedback obtaining system to establish a connection between a user device of a user and a server of a service provider based on a user location of the user received from the user device, receive static data from the server and dynamic data from a capturing device located at a site of the service provider, identify contextual information associated with the user based on the static data and the dynamic data. The contextual information comprises implicit feedback of the user. The instruction causes the processor to provide one or more feedback queries for the user from a database based on the contextual information, provide one or more sub-feedback queries for the user based on a response of the user for the one or more feedback queries and obtain user feedback based on a response of the user for the one or more feedback queries and the one or more sub-feedback queries and the implicit feedback.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

Figure 1:
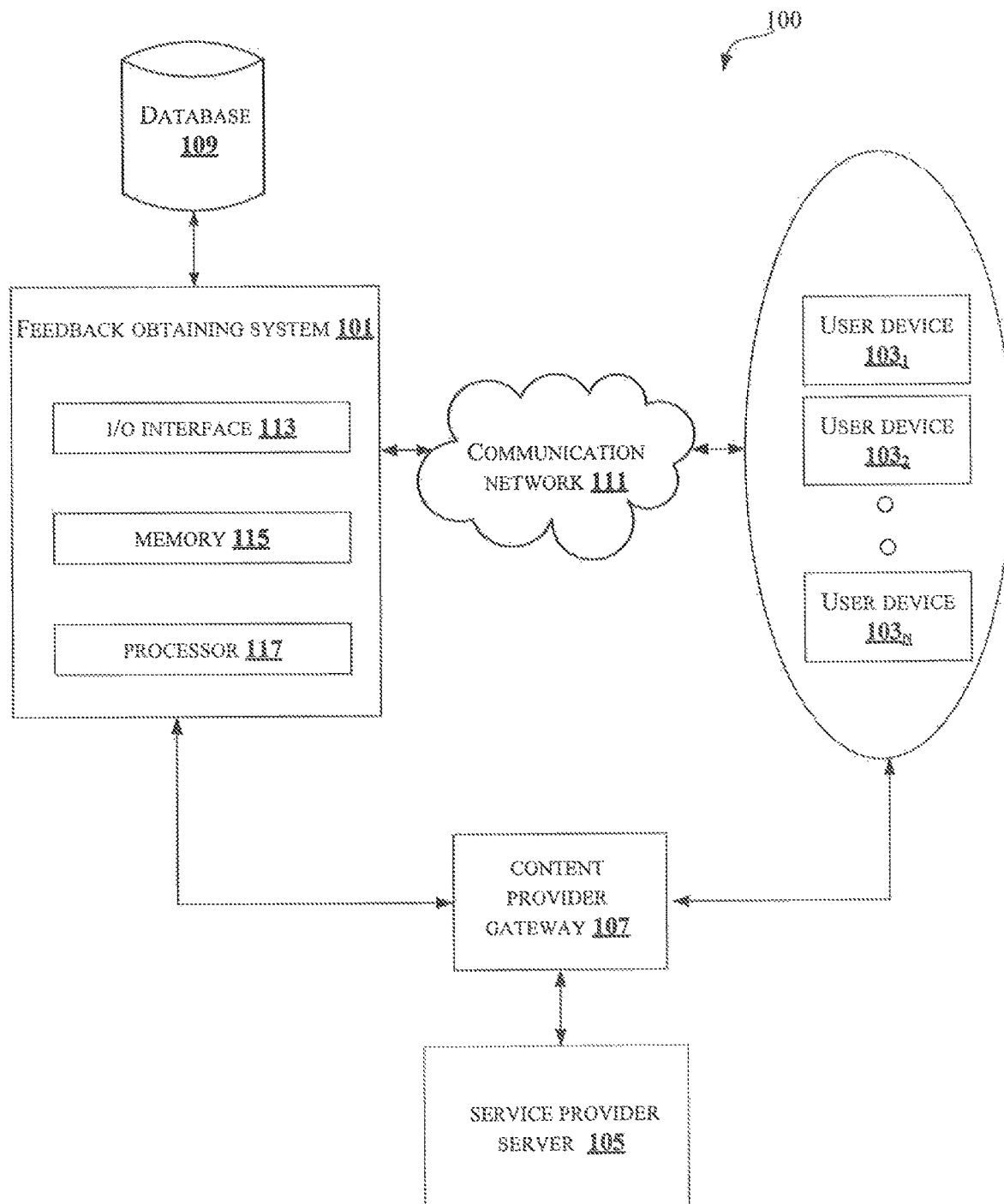
FIG. 1 illustrates an exemplary environment for obtaining interactive user feedback in real-time in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure may relate to a method and a feedback obtaining system for obtaining interactive user feedback in real-time. In an embodiment, the present disclosure may obtain feedback of users based on implicit feedback and explicit feedback of the users. To obtain user feedback in real-time, whenever users approaches any service provider for services, the feedback obtaining system establishes a connection between a user device of the users and a server of a service provider based on a user location received from the user device. In an embodiment, the user device may be a device registered with the service provider. Once the connection is established, static data of the user is retrieved from the server. Also, dynamic data of the user, such as, user action is captured at a site of the service provider and provided to the feedback obtaining system. Based on the static and dynamic data of the user, implicit feedback of the user is obtained by identifying contextual information associated with the user. On identifying the implicit feedback, the users may be provided with one or more feedback queries based on the contextual information. Once a response for the one or more feedback queries is received, one or more sub-feedback queries may also be provided to the user. The interactive user feedback is obtained based on a response of the user for the one or more feedback queries and the one or more sub-feedback queries and the implicit feedback. In the present disclosure, the implicit feedback from user actions, gestures and the like blended with actual feedback is utilized to provided interactive and effective feedback of user in real-time.

FIG. 1 illustrates an exemplary environment for obtaining interactive user feedback in real-time in accordance with some embodiments of the present disclosure.

As shown in FIG. 1, the environment 100 comprises a feedback obtaining system 101 connected through a communication network 111 to a user device $103_1$, a user device $103_2$ . . . and a user device $103_N$ (collectively called as plurality of user devices 103). The feedback obtaining system 101 may also be connected to a content provider gateway 107 and a database 109. In an embodiment, the content provider gateway 107 may be used for connecting an application running on the plurality of user devices 103 of users with a service provider server 105. In an embodiment, the service provider server 105 (also, referred as server of a service provider) may be located at the service provider's premises and may connect with the plurality of user devices 103. In an embodiment, the plurality of user devices 103 may include, but are not limited to, a laptop, a desktop computer, a Personal Digital Assistant (PDA), a notebook, a smartphone, a tablet and any other computing devices. In an embodiment, the feedback obtaining system 101 may include, but are not limited to, a laptop, a desktop computer, a Personal Digital Assistant (PDA), a notebook, a smartphone, a tablet and any other computing devices. In an embodiment, the feedback obtaining system 101 obtains user feedback based on implicit feedback of the user and actual feedback through response to feedback queries from the user in real-time. Whenever a user device and user location of the plurality of user devices 103 is identified at a site of the service provider, the feedback obtaining system 101 establishes a connection between the user device and the service provider server 105 through the content provider gateway 107. In an embodiment, the user location may include coordinate details of the user. In an embodiment, the identified user device at the site may be registered previously to the service provider. Based on identification of the user device associated with the user, the feedback obtaining system 101 receives static data of the user from the service provider server 105 along with dynamic data of the user. The dynamic data of the user may be captured by a capturing unit (not shown in FIG. 1, covered in FIG. 3) located at the site of the service provider. The capturing unit may be for example, a camera, a Closed-Circuit Television (CCTV) camera and the like. In an embodiment, the static data of the user may include contact details, login credentials, user images and historic feedback data associated with the user. A person skilled in the art would understand that the static data may also include any other type of data not explicitly mentioned in the present disclosure. In an embodiment, the dynamic data of the user may include a video of the user captured at the site of the service provider. The static data and dynamic data of the user is analyzed by the feedback obtaining system 101 for identifying contextual information associated with the user. In an embodiment, the contextual information comprises implicit feedback of the user. In an embodiment, the identification of the contextual information may comprise generation of one or more static attributes and one or more dynamic attributes associated with user actions. The user actions are identified from dynamic data of the user. For example, static attributes may include color of clothes of user, which may be used for subsequent identification of the user and the one or more dynamic attributes may be associated with behavior of the user towards services provided by service providers. Once the static data and dynamic data are analyzed and user actions are interpreted, the feedback obtaining module 101 may provide one or more feedback queries to the service provider server 105 for the user. The service provider server 105 provides the one or more feedback queries to the user. The one or more feedback queries are provided based on the interpretation of the user actions, contextual information, ambience of the site, significance of a day and the like. In addition, on receiving a response for the one or more queries from the user, the feedback obtaining system 101 may also provide one or more sub-feedback queries for the user. The one or more feedback queries and one or more sub-feedback queries are stored in the database 109. In an embodiment, the data stored in the database 109 may be stored in the memory of the feedback obtaining system 101. The feedback obtaining system 101 obtains user feedback based on a response of the user for the one or more sub-feedback queries and the one or more feedback queries and the implicit feedback of the user.

The feedback obtaining system 101 comprises an I/O Interface 113, a memory 115 and a processor 117. The I/O interface 113 may be configured to receive the location details of the users of the plurality of user devices 103. The I/O interface 113 may also receive the static data of the user from the service provider server 105 and the dynamic data of the user from the capturing unit located at the service provider site.

The received information from the I/O interface 113 is stored in the memory 115. The memory 115 is communicatively coupled to the processor 117 of the feedback obtaining system 101. The memory 115 also stores processor instructions which cause the processor 117 to execute the instructions for obtaining interactive user feedback in real-time.

Figure 2:
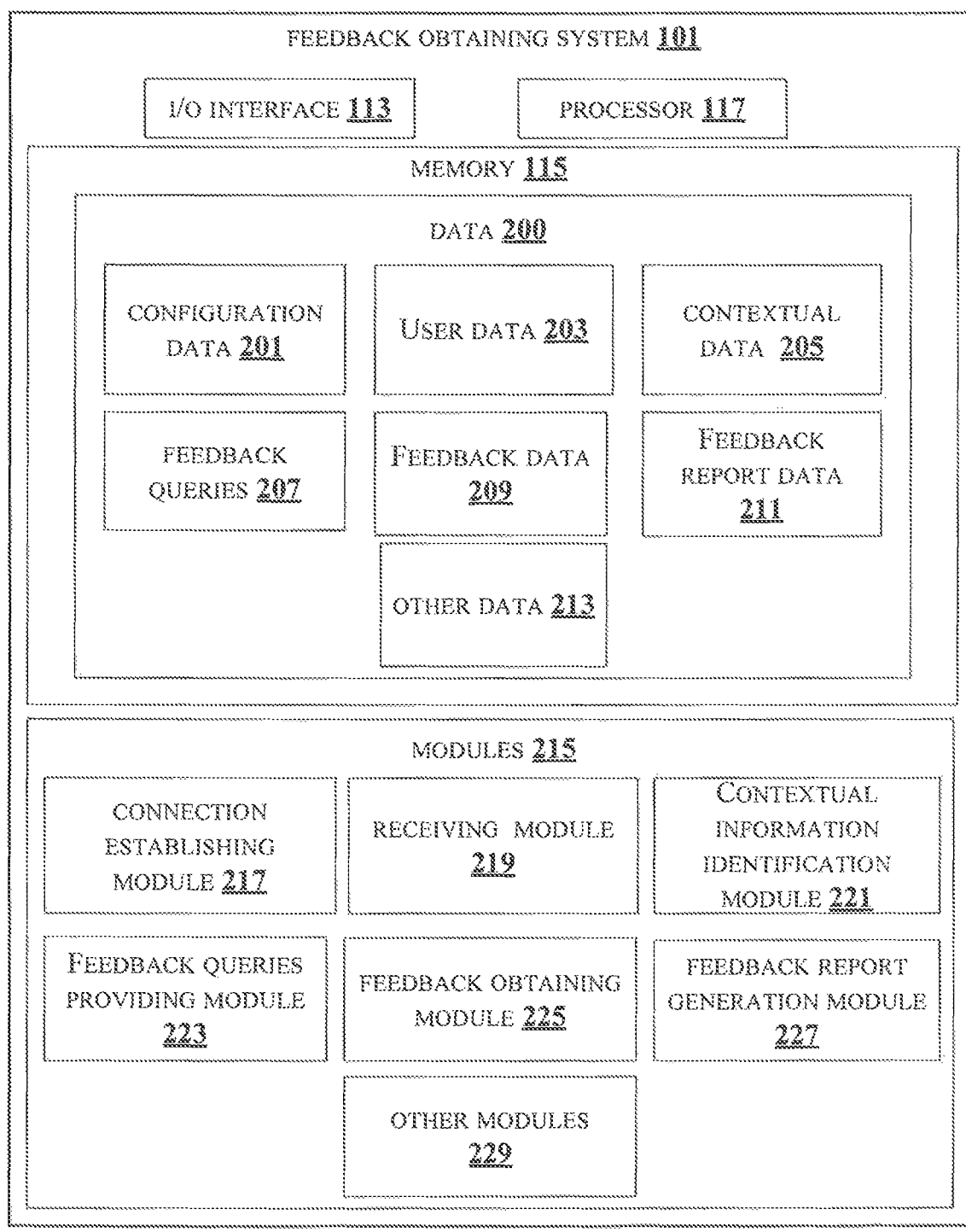
FIG. 2 shows a detailed block diagram of a feedback obtaining system in accordance with some embodiments of the present disclosure.

FIG. 2 shows a detailed block diagram of a feedback obtaining system in accordance with some embodiments of the present disclosure.

Data 200 and one or more modules 215 of the feedback obtaining system 101 are described herein in detail. In an embodiment, the data 200 comprises configuration data 201, user data 203, contextual data 205, feedback queries 207, feedback data 209, feedback report data 211 and other data 213.

The configuration data 201 may comprise details of the services or entity provided by the service provider. The configuration data 201 may be for the services and entity which may require configuration at each site of the service provider. In an embodiment, the feedback from the user is sought for the services and entity. For example, in a restaurant, the configuration data 201 may comprise details of food types, varieties and associated details. Further, the configuration data 201 may comprise details about various type of user devices and platforms which the service provider server 105 may support. In an embodiment, the configuration data 201 may also comprise one or more supported communication protocols such as, WIFI, ZigBee, Bluetooth and the like.

The user data 203 may comprise static data of the user at the service provider server 105. At the time of registration of the user device, the static data associated with the user is collected and stored at the service provider server 105. The static data may include login details, mobile number, email-id, user images, previous historic data associated with the user. In an embodiment, the historic data of the user may include, but is not limited to, previous feedback of user, likes and dislikes of the user, past feedback analysis of the user and the like. A person skilled in the art would understand that any other data retrieved during registration of the user device may also be included in the present disclosure. Further, the user data 203 may include dynamic data associated with the user. The dynamic data may include video of the user captured at the site of the service provider. In an embodiment, the dynamic data may include, timestamp details, location details at the site of the service provider, video containing the user and the like.

The contextual data 205 (also referred as contextual information) may include analysed data associated with the static and dynamic data of the user. The contextual data 205 may be used for identifying the implicit feedback of the user. In an embodiment, the contextual data 205 may include, object details which may be extracted from frames of the video captured by the capturing unit at the site of the service provider. In an embodiment, the objects may include fixed structures of the service provider's site and object of interest of the user. For example, in a restaurant, object details from the video of the user may include fixed structure of the restaurant such as, plate, chair, lights and the like and object of interest may include the user identification from the video of the user.

Feedback queries 207 may comprise feedback queries generated previously based on the service or entity of the service provider. The feedback queries 207 may be provided to the user based on the contextual data 205 associated with the user. In some embodiment, the feedback queries 207 to be put forward to the user may be based on ambience of the site of the service provider, significance of the day, user previous feedback and the like. For an example, in a restaurant where the food item is pizza, if the previous feedback from a couple of users is that the pizza is hard, then a logical feedback query to users may be "how do you rate softness of pizza", to extract useful feedback of the users. Another example, if lights fuses out near the user, the feedback query may be "could you manage with the lighting condition" and the like. Further, the feedback queries 207 may also comprise sub-feedback queries for the users based on the response of the user for the feedback queries. For the same example of restaurant, where the user responds by saying that pizza was not soft, the sub-feedback query may be "Whole pizza was hard or pizza was hard only at the edges" and the like.

The feedback data 209 may comprise user feedback, which is based on the implicit feedback of the user such as from user actions, gestures and the like and based on the response for the feedback queries and sub-feedback queries.

The feedback report data 211 may comprise a feedback report of the user based on the feedback data 209. In an embodiment, the feedback report may include one or more actions which may be taken immediately based on the feedback, for improving satisfaction of the users before the user leaves the site of the service provider.

The other data 213 may store data, including temporary data and temporary files, generated by the one or more modules 215 for performing the various functions of the feedback obtaining system 101.

In an embodiment, the data 200 in the memory 115 are processed by the one or more modules 215 of the feedback obtaining system 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules when configured with the functionality defined in the present disclosure will result in a novel hardware.

In one implementation, the one or more modules 215 may include, but are not limited to, a connection establishing module 217, a receiving module 219, a contextual information identification module 221, a feedback queries providing module 223, a feedback obtaining module 225 and a feedback report generation module 227. The one or more modules 215 may also comprise other modules 229 to perform various miscellaneous functionalities of the feedback obtaining system 101. It will be appreciated that such modules 215 may be represented as a single module or a combination of different modules.

The connection establishing module 217 may establish connection between the user device of the plurality of user devices 103 with the service provider server 105. The connection may be established once the user is at the site of service provider and user location is received. In some embodiment, the user location may be identified by the service providing server 105 using one or more means such as, GPS tracker in user's device. A person skilled in the art would understand that any other means not mentioned explicitly may also be included in the present disclosure. In an embodiment, the plurality of user devices 103 may get automatically connected with the service provider server 105 on entering the site of the service provider.

The receiving module 219 may receive the static data of the user from the service provider server 105 on successful establishment of connection. The static data of the user may be collected and stored previously during registration of the user device associated with the user. The static data of the user may include login details, contact details, user images and historic data associated with the user. The receiving module 219 may also receive the dynamic data of the user from the capturing unit located at the site of the service provider. The dynamic data includes the video of the user at the site of the service provider. The video captured by the capturing unit may include for example, timestamp details, location at the site of the service provider, video of the user and the like.

The contextual information identification module 221 may identify contextual information associated with the user based on the static and dynamic data of the user. In an embodiment, the contextual information identification module 221 may analyse the static and dynamic data of the user to identify implicit feedback of the user. Based on the analysis, one or more objects may get extracted from the video of the user through any known techniques. In an embodiment, the objects may comprise of fixed structures of the service provider's site and object of interest. Once the objects are identified, the contextual information identification module 221 may generate an attribute table which may include one or more static attributes such as, physical features of an entity at the site of service provider and dynamic parameters such as user actions. Further, the contextual information identification module 221 may convert the user actions from the dynamic data into textual description of actions with the help of deep learning technique. In an embodiment, a Convolution Neural Network (CNN) followed by a Recurrent Neural Network (RNN) may be used by the contextual information identification module 221 to associate a textual description with the corresponding video of the user. A person skilled in the art would understand that any other techniques not included in the present invention for converting the user actions into textual description may also be included in the present disclosure. For example, in a restaurant, when the user pushes the plate away with disgust, the CNN and the RNN pair returns a string stating "user is not happy with the food and rejecting it". In an embodiment, the contextual information provides an interpretation of the user action. In an embodiment, the contextual information may also indicate user context identified from the captured video of the user. In one embodiment, for example, user A orders and gets pizza on a table, User B orders a sandwich. The user context of A in such case is associated with pizza and that of B with Sandwich. The attributes associated with the user context starts populating as shown in table 1. For instance, for pizza, the following attributes may be associated.

TABLE 1

| Start time | End time | Action | Context | Attributes | Values |
|---|---|---|---|---|---|
| 10:10 | 10:40 | Order | Pizza | Number | 2 |
| 10:40 | 10:43 | Eating | Pizza | Liking | Pushed after 3 mins |
|  |  |  |  | Face expression | Disgust |
|  |  |  |  | Quantity of food consumed | 40% |

As shown in table 1, the user A, waited for 30 minutes to get the pizza and ate for 3 minutes. In an embodiment, if the user does not have a user device, a unique identifier may be associated with the user image or the user in totality, if the face is not visible. For example, video of the user shows that a red shirt user pushed the plate. The pushing of the plate by the red shirt user may infer that the red shirt user does not like the food, although face and the degree of disgust is not visible.

The feedback queries providing module 223 may provide one or more feedback queries for the user based on the contextual information associated with the user. In an embodiment, the one or more feedback queries are provided depending on ambience (i.e. environment such as, look and feel of the site), relevance (significance of the day) and context. Initially, one or more templates are generated by the feedback queries providing module 223. In an embodiment, the conversation with user may be initiated with user through NLP (Natural Language Processing) and the one or more templates may get converted to one or more feedback queries through a query engine. For example, in a restaurant, if a couple of customers feel pizza is hard, a logical feedback query may be "how do you rate softness of pizza", such that, useful feedback is extracted. For another example, if the light fuses out near the user, the feedback query may be "could you manage with the lighting condition". In an embodiment, the one or more feedback queries may be generated by the feedback queries providing module 223 through the query engine which may be linked to a domain structure specific to the service of the service provider. The domain may be different for different types of services such as, banking, restaurant, malls and the like. In an embodiment, if the service type is restaurant, then attributes associated with a food for example, pizza may be softness, colour, topping and the like which may be interpreted from the video. Similarly, the attributes of user who may be eating the pizza, may cover facial expression, duration of consumption, user action and the like. The one or more feedback queries to be put to the user depends up on the gesture, emotions and the like of the user, captured through the capturing unit. For example, in case, if the user discards a specific part of the food in a restaurant (i.e. Sauce that comes with Pizza), feedback queries may be on the quality of the said part of the food. In such case, feedback query may be "how do we make the pizza appealing for you". In an embodiment, the query strings may be finite and may be stored in advance or a simple Natural Language Generation (NLG) Application Programming Interface (API) may be used to generate in real time. In an embodiment, the users who may wish to provide feedback offline, the feedback obtaining system 101 may recreate a virtual environment of the site of the service provider for the user for providing feedback. The recreated environment may help the user to recollect the events to provide the feedback more effectively. For example, user sees flickering light in the video and remembers how the lights annoyed while waiting in a bank and provides feedback on the same. In an embodiment, in addition to feedback, users may also indicate how things may have been placed at the site of the service provider, using object manipulation. For example, if the user feels a lamp may be placed on opposite wall, the user may simply drag and drop in the virtual environment. The brightness also changes accordingly. In another example, if the user feels shirts in a shop may be placed in a specific rack, the user can rearrange the shirts in virtual environment. Further, the feedback queries providing module 223 may also provide sub-feedback queries for the user based on the response of the user for the feedback queries. The sub-feedback queries may be an independent conversation with a different attribute or context. This may be achieved by storing the conversation history and maintaining a separate context for sub-feedback queries. For example, if the user responds on the softness query as pizza was not soft, the sub-feedback query may be "the whole pizza was hard or was only at edges".

The feedback obtaining module 225 may obtain user feedback based the implicit feedback from the actions/gestures and facial emotions of the user together with response of the one or more feedback queries and the sub-feedback queries. In an embodiment, itemized feedback may also be feasible, for example, on the smoothness of the pizzas. In one embodiment, sentimental analysis may be done on implicit feedback and responses of one or more feedback queries and sub-feedback queries. In an embodiment, one or more feedback may be given a weightage adaptively, based on relative importance of feedback from different channels.

The feedback report generation module 227 may generate and prepare a feedback report of the user in readable form. Based on the user feedback, certain actions may be taken immediately before the user leaves the site of the service provider. In an embodiment, a time alert may be generated for a pre-defined user feedback. For example, if the user in a restaurant throws pizza with disgust, the user may be charged less or provided with a discount coupon.

Figure 3:
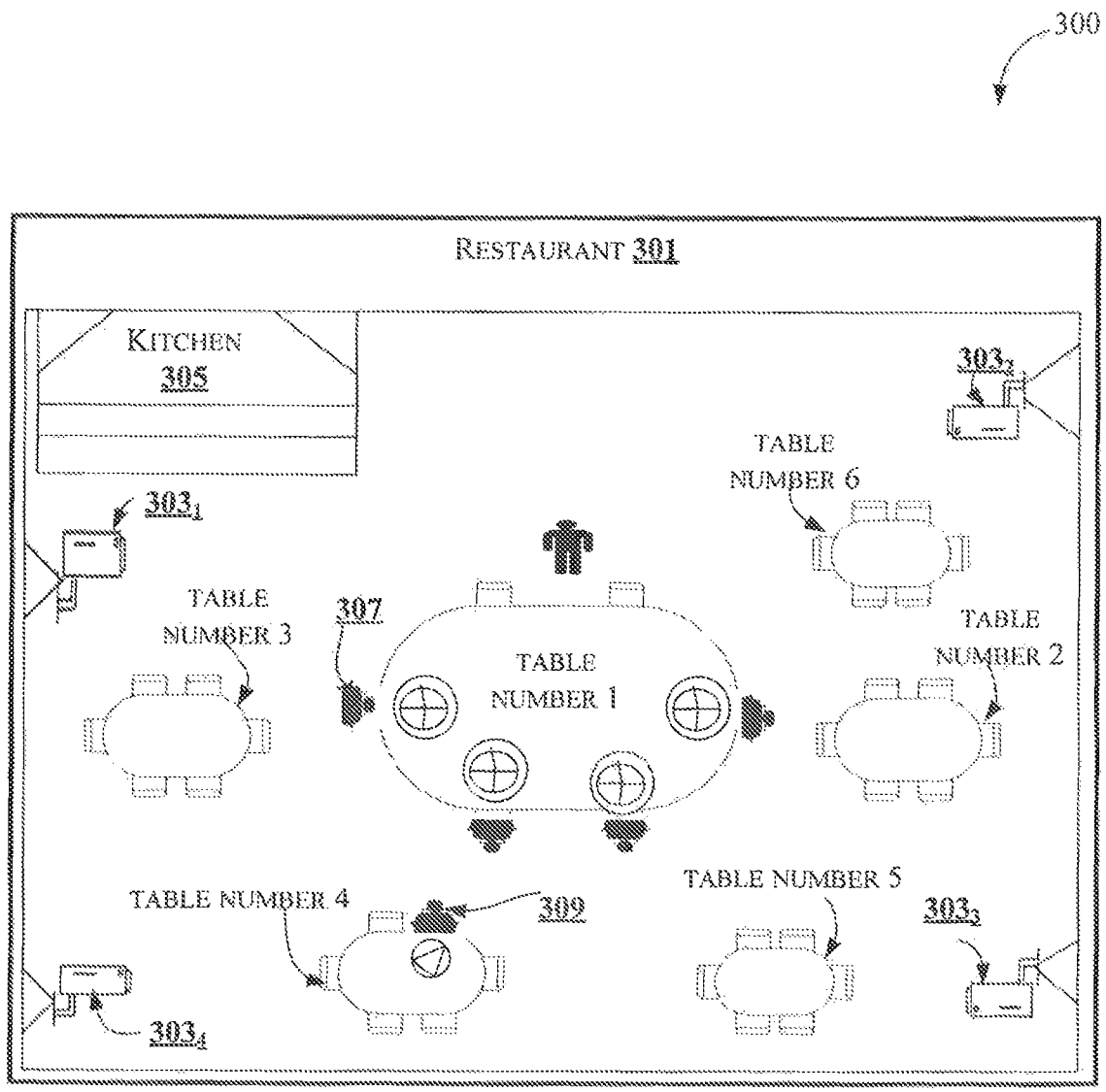
FIG. 3 shows an exemplary representation of a service provider site for obtaining interactive user feedback in real-time in accordance with some embodiments of the present disclosure.

FIG. 3 shows an exemplary representation of a service provider for obtaining interactive user feedback in real-time in accordance with some embodiments of the present disclosure.

As shown in FIG. 3, the environment 300 illustrates a scenario of a site of restaurant service in an exemplary embodiment of the present disclosure. The environment 300 comprises a feedback obtaining set-up which consist of a first video camera $303_1$, a second video camera $303_2$, a third video camera $303_3$ and a fourth video camera $303_4$ placed at four corners of the restaurant 301. Further, the environment 300 comprises of a kitchen 305 in the restaurant 301, and one or more tables. The tables are marked as table number 1, table number 2, table number 3, table number 4, table number 5 and table number 6. Further, as shown in the FIG. 3, the environment comprises of users seated on the table number 1 and table number 4. Initially, when a user 307 who may be previously registered to the restaurant 301, enters the restaurant 301. The location of the user 307 is determined by a server of the restaurant 301 based on details of user device associated the user 307. In an embodiment, the location of the user 307 may be identified by receiving GPS coordinates from the user device associated with the user 307. Based on the location details of the user 307, a feedback obtaining system 101 (not shown in FIG. 3) may establish a connection between the user device of the user 307 and the server of the restaurant 301. Once a connection between the user device of the user 307 and the server of the restaurant is established, the feedback obtaining system 101 may receive the static data of the user 307. The static data associated with the user 307 may be stored previously at the time of registration. The static data of the user 307 may include, mobile number, login details, user images and historic data associated with user 307. In addition to the static data, the feedback obtaining system 101 may also receive dynamic data of the user 307. The dynamic data of the user 307 include video of the user 307 captured at the restaurant 301 by the video camera $303_1$. As shown in FIG. 3, the user 307 is seated on table number 1 and is eating some food. The video of the user 307 is being captured by the video camera $303_1$, which captures all the actions of the user 307. Further, based on the static data and video of the user 307, the feedback obtaining system 101 identifies contextual information associated with the user 307. The contextual information associated with the user 307 may include gestures, actions, facial expression of the user 307. For instance, in FIG. 3, the video data from the video camera $303_1$ shows that the user 307 pushes one of the plate being served and does not eat the food from that plate. Based on the contextual information, the feedback obtaining system 101 may provide one or more queries for the user 307 to the server of the restaurant 301. In an embodiment, the one or more feedback queries may be provided to the user 307 based on implicit feedback of multiple users in the restaurant 301. For instance, the one or more feedback queries may be with respect to the food which was served on the plate which the user 307 did not eat. On receiving a response from the user 307, the feedback obtaining system 101 may further provide one or more sub-feedback queries for the user 307. Later, the feedback obtaining system 101, obtains the user feedback based on the implicit feedback coming from user actions, gestures and the like and the response for the feedback and sub-feedback queries.

Figure 4:
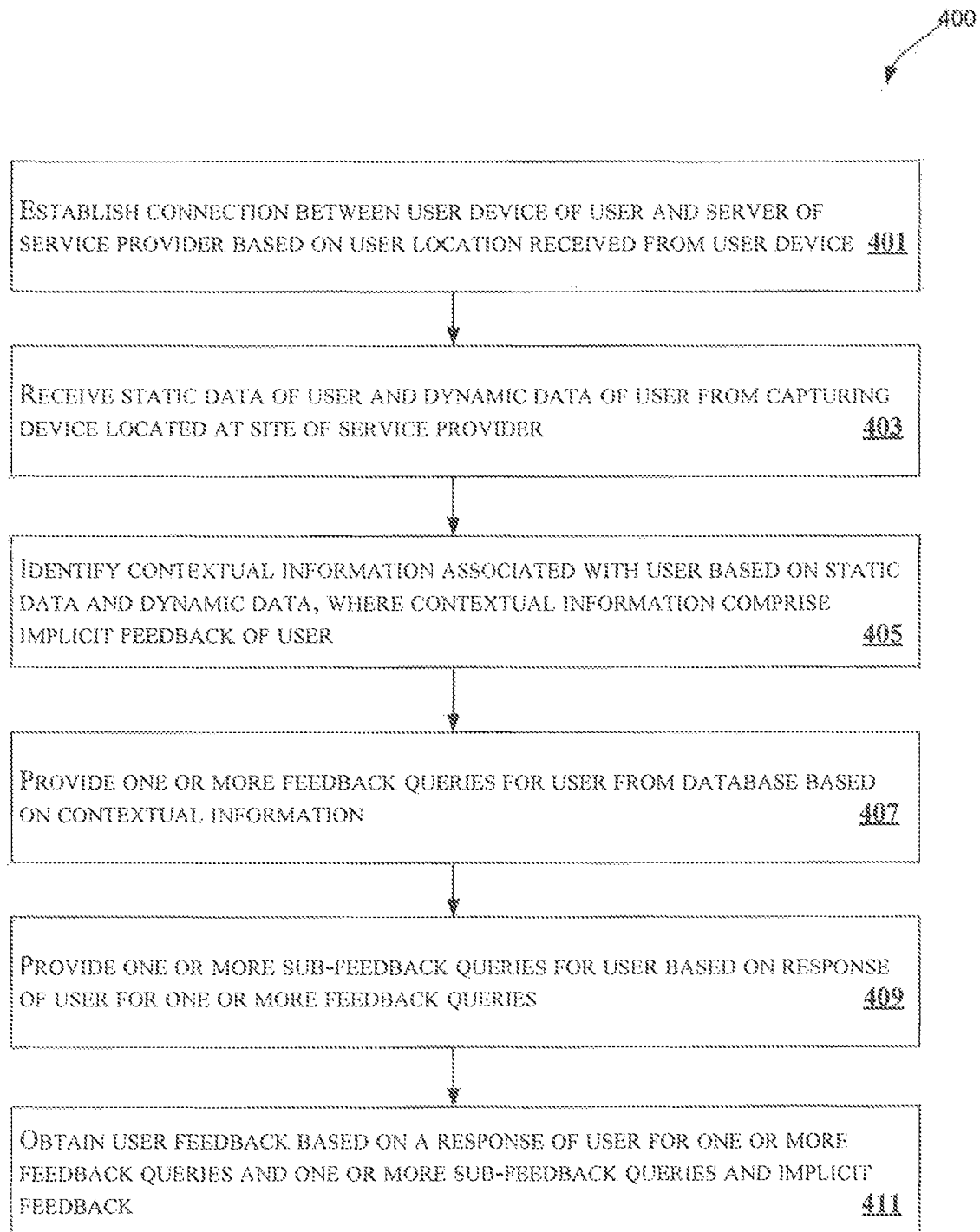
FIG. 4 illustrates a flowchart showing a method of obtaining interactive user feedback in real-time in accordance with some embodiments of present disclosure.

FIG. 4 illustrates a flowchart showing a method of obtaining interactive user feedback in real-time in accordance with some embodiments of present disclosure.

As illustrated in FIG. 4, the method 400 comprises one or more blocks for obtaining interactive user feedback in real-time. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the feedback obtaining system 101 establishes the connection between the user device associated with the user and service provider server 105 based on the user location received from the user device.

At block 403, the feedback obtaining system 101 receives static data of the user from the service provider server 105 and dynamic data of the user from the capturing device located at the site of the service provider.

At block 405, the feedback obtaining system 101 identifies contextual information associated with the user based on the static data and the dynamic data. In an embodiment, the contextual information comprises implicit feedback of the user.

At block 407, the feedback obtaining system 101 provides one or more feedback queries for the user from the database 109 based on the contextual information.

At block 409, the feedback obtaining system 101 provides one or more sub-feedback queries for the user based on the response of the user for the one or more feedback queries.

At block 411, the feedback obtaining system 101 obtains user feedback based on the response of the user for the one or more feedback queries and the one or more sub-feedback queries and the implicit feedback.

Figure 5:
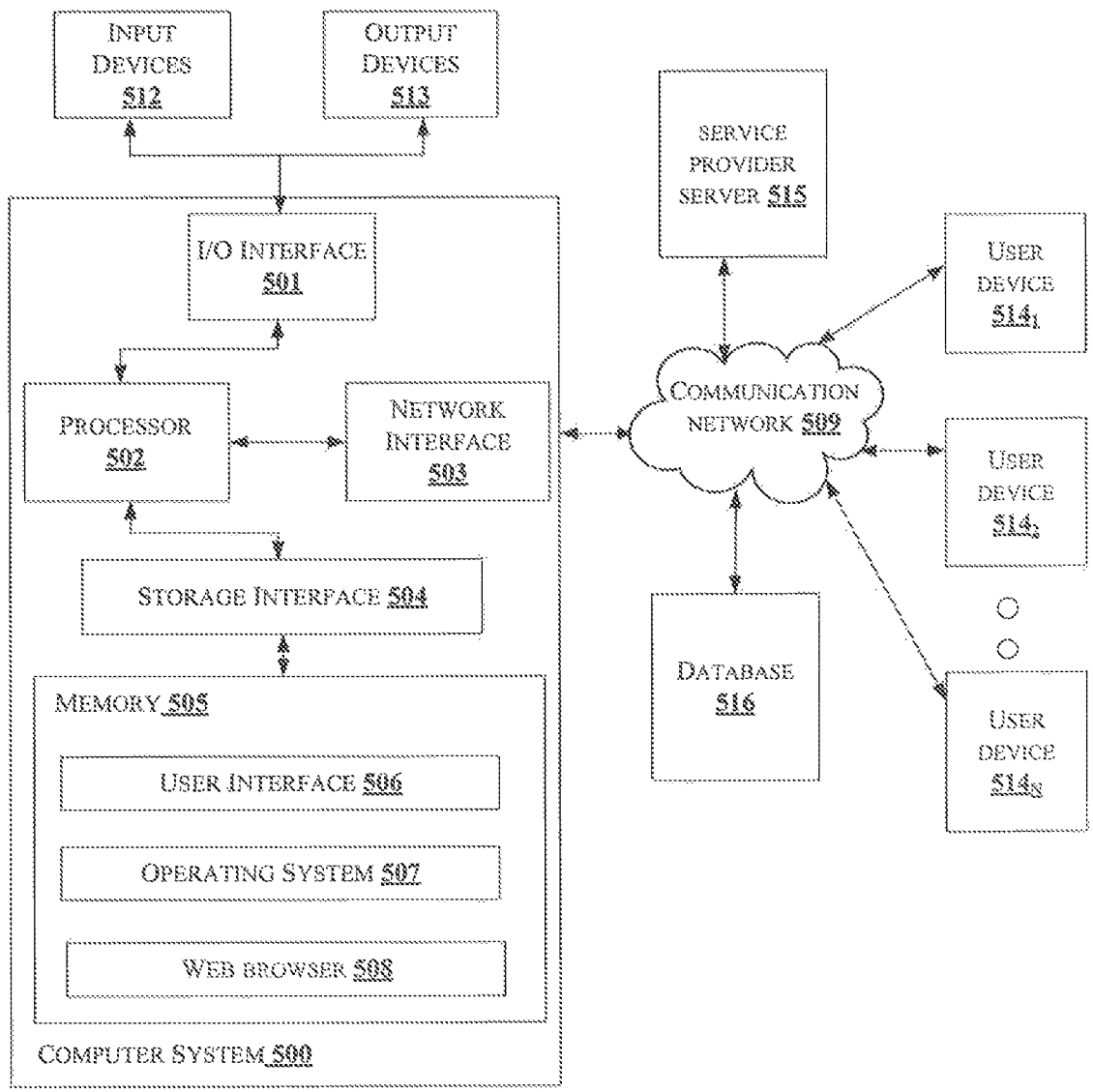
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the feedback obtaining system 101. The computer system 500 may comprise a central processing unit ("CPU" or "processor") 502. The processor 502 may comprise at least one data processor for obtaining interactive feedback of the user in real-time. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma. Plasma display panel (PDP), Organic light-emitting diode display (OLED) or the like), audio speaker, etc.

In some embodiments, the computer system 500 consists of a feedback obtaining system 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a user device $514_1$, a user device $514_2$ . . . and a user device $515_N$, a service provider server 516 and a database 517. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 500. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure obtains implied feedback from user gestures which are blended with actual feedback to get effective feedback of users.

An embodiment of the present disclosure recreates a scenario of the site of service provider for users to remember whenever feedback is provided offline.

An embodiment of the present disclosure provides a single feedback framework which caters for multiple services.

An embodiment of the present disclosure provides user satisfaction by providing instant resolutions on user feedback.

An embodiment of the present disclosure provides a provision to users to provide an offline feedback by performing virtual object manipulation at the site of the service provider.

An embodiment of the present disclosure generates templates for users for providing feedback based on context associated with users.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may comprise media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media comprise all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" comprises non-transitory computer readable medium, hardware logic, and/or transmission signals in which code may be implemented. A device in which the code implementing the described embodiments of operations is encoded may comprise a computer readable medium or hardware logic. Of course, those skilled in the art will recognize that many modifications may be made to this configuration without departing from the scope of the invention, and that the article of manufacture may comprise suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
|---|---|
| 100 | Environment |
| 101 | Feedback obtaining system |
| 103 | Plurality of user device |
| 105 | Service provider server |
| 107 | Content provider gateway |
| 109 | Database |
| 111 | Communication network |
| 113 | I/O interface |
| 115 | Memory |
| 117 | Processor |
| 200 | Data |
| 201 | Configuration data |
| 203 | User data |
| 205 | Contextual data |
| 207 | Feedback queries |
| 209 | Feedback data |
| 211 | Feedback report data |
| 213 | Other data |
| 215 | Modules |
| 217 | Connection establishing module |
| 219 | Receiving module |
| 221 | Contextual information identification module |
| 223 | Feedback queries providing module |
| 225 | Feedback obtaining module |
| 227 | Feedback report generation module |
| 229 | Other modules |

What is claimed is:

1. A method for obtaining interactive user feedback in real-time, the method comprising:
   establishing, by a feedback obtaining system, a connection between a user device of a user and a server of a service provider based on a user location received from the user device;
   receiving, by the feedback obtaining system, static data of the user from the server and dynamic data of the user from a capturing device located at a site of the service provider, wherein the dynamic data of the user comprises video of the user captured at the site of the service provider, and wherein the video of the user comprises user gestures and facial emotions of the user in response to service provided by the service provider;
   identifying, by the feedback obtaining system, contextual information associated with the user based on the static data and the dynamic data, wherein the contextual information comprises implicit feedback of the user;
   providing, by the feedback obtaining system, one or more feedback queries for the user from a database based on the contextual information;
   providing, by the feedback obtaining system, one or more sub-feedback queries for the user based on a response of the user for the one or more feedback queries; and
   obtaining, by the feedback obtaining system, user feedback based on a response of the user for the one or more sub-feedback queries and the one or more feedback queries and the implicit feedback.

2. The method as claimed in claim 1, wherein the user location comprises coordinate details of the user.

3. The method as claimed in claim 1, wherein the static data of the user comprises contact details, login credentials, user images and historic feedback data associated with the user.

4. The method as claimed in claim 1, wherein identifying contextual information comprises generating one or more static attributes and one or more dynamic attributes associated with user actions.

5. The method as claimed in claim 1, further comprising generating a feedback report based on the user feedback.

6. The method as claimed in claim 1, further comprising recreating a virtual environment of the site of the service provider for the user for providing feedback, when the connection established between the user device and the server of the service provider disconnects.

7. A feedback obtaining system for obtaining interactive user feedback in real-time, comprising:
   a processor; and
   a memory communicatively coupled to the processor, wherein the memory stores processor instructions, which, on execution, causes the processor to:
   establish a connection between a user device of a user and a server of a service provider based on a user location received from the user device;
   receive static data of the user from the server and dynamic data of the user from a capturing device located at a site of the service provider, wherein the dynamic data of the user comprises video of the user captured at the site of the service provider, and wherein the video of the user comprises user gestures and facial emotions of the user in response to service provided by the service provider;
   identify contextual information associated with the user based on the static data and the dynamic data, wherein the contextual information comprises implicit feedback of the user;
   provide one or more feedback queries for the user from a database based on the contextual information;
   provide one or more sub-feedback queries for the user based on a response of the user for the one or more feedback queries; and
   obtain user feedback based on a response of the user for the one or more feedback queries and the one or more sub-feedback queries and the implicit feedback.

8. The feedback obtaining system as claimed in claim 7, wherein the user location comprises coordinate details of the user.

9. The feedback obtaining system as claimed in claim 7, wherein the static data of the user comprises contact details, login credentials, user images and historic feedback data associated with the user.

10. The feedback obtaining system as claimed in claim 7, wherein the processor identifies contextual information by generating one or more static attributes and one or more dynamic attributes associated with user actions.

11. The feedback obtaining system as claimed in claim 7, wherein the processor generates a feedback report based on the user feedback.

12. The feedback obtaining system as claimed in claim 7, wherein the processor recreates a virtual environment of the site of the service provider for the user for providing feedback, when the connection established between the user device and the server of the service provider disconnects.

13. A non-transitory computer readable medium including instruction stored thereon that when processed by at least one processor cause a feedback obtaining system to perform operation comprising:
   establishing a connection between a user device of a user and a server of a service provider based on a user location received from the user device;
   receiving static data of the user from the server and dynamic data of the user from a capturing device located at a site of the service provider, wherein the dynamic data of the user comprises video of the user captured at the site of the service provider, and wherein the video of the user comprises user gestures and facial emotions of the user in response to service provided by the service provider;
   identifying contextual information associated with the user based on the static data and the dynamic data, wherein the contextual information comprises implicit feedback of the user;
   providing one or more feedback queries for the user from a database based on the contextual information;
   providing one or more sub-feedback queries for the user based on a response of the user for the one or more feedback queries; and
   obtaining user feedback based on a response of the user for the one or more sub-feedback queries and the one or more feedback queries and the implicit feedback.

14. The medium as claimed in claim 13, wherein the user location comprises coordinate details of the user.

15. The medium as claimed in claim 13, wherein the static data of the user comprises contact details, login credentials, user images and historic feedback data associated with the user.

16. The medium as claimed in claim 13, wherein the instruction causes the processor to identify contextual information by generating one or more static attributes and one or more dynamic attributes associated with user actions.

17. The medium as claimed in claim 13, wherein the instruction causes the processor to generate a feedback report based on the user feedback.

18. The medium as claimed in claim 13, wherein the instruction causes the processor to recreate a virtual environment of the site of the service provider for the user for providing feedback, when the connection established between the user device and the server of the service provider disconnects.

* * * * *